United States Patent
Kunzman (10) Patent No.: US 6,536,904 B2
(45) Date of Patent: Mar. 25, 2003

(54) REDUCED COLOR SEPARATION WHITE ENHANCEMENT FOR SEQUENTIAL COLOR DISPLAYS

(75) Inventor: Adam J. Kunzman, Fairview, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/037,102

(22) Filed: Dec. 31, 2001

(65) Prior Publication Data
US 2002/0122160 A1 Sep. 5, 2002

Related U.S. Application Data
(60) Provisional application No. 60/259,303, filed on Dec. 30, 2000.

(51) Int. Cl.[7] .............................................. G03B 21/14
(52) U.S. Cl. ........................... 353/31; 353/121; 348/743
(58) Field of Search ............................. 353/31, 34, 37, 353/84, 121; 348/742, 743, 771, 759, 760; 345/690

(56) References Cited

U.S. PATENT DOCUMENTS

| | | | |
|---|---|---|---|
| 5,592,188 A | * | 1/1997 | Doherty et al. ............... 345/84 |
| 6,054,832 A | * | 4/2000 | Kunzman et al. ........... 318/599 |
| 6,226,054 B1 | * | 5/2001 | Morgan et al. ............. 345/589 |
| 6,256,425 B1 | | 7/2001 | Kunzman |
| 6,324,006 B1 | * | 11/2001 | Morgan ....................... 348/742 |
| 6,392,717 B1 | * | 5/2002 | Kunzman .................... 348/655 |
| 6,406,148 B1 | * | 6/2002 | Marshall et al. ............ 348/742 |

* cited by examiner

Primary Examiner—William Dowling
(74) Attorney, Agent, or Firm—Charles A. Brill; Wade James Brady, III; Frederick J. Telecky, Jr.

(57) ABSTRACT

A method and apparatus for reducing the color separation in sequential color display systems. The disclosed approach adds a white (clear) segment 923 to the color filtering system 92 and applies an algorithm, which separates the luminance channel as much as possible into this white segment. As a result, in the case of a black-and-white image where color separation is most visible, color segments will have a minimal amount of energy in them, thereby reducing the color separation effect. The algorithm controls the process of transferring the energy from the colored segments into the white segment and also allows for a dynamic mode, where on a pixel-by-pixel basis, both color separation reduction is made for the white portions of the image and overall image brightness is improved in the non-white (color) portions of the image.

8 Claims, 5 Drawing Sheets

REDUCED COLOR SEPARATION WHITE ENHANCEMENT FOR SEQUENTIAL COLOR DISPLAYS

CROSS-REFERENCE TO RELATED APPLICATIONS

This application claims priority under 35 USC § 119(e)(1) of provisional application No. 60/259,303 filed Dec. 30, 2000.

This invention is related to the invention disclosed and claimed in U.S. patent application Ser. No. 09/085,992, filed on May 27, 1997, and entitled "Adaptive White Light Enhancement for Displays" the contents of which are hereby incorporated by reference in this application.

BACKGROUND OF THE INVENTION

1. Field of the Invention

The present invention relates to display systems and particularly to single or dual-panel spatial light modulator sequential color systems.

2. Description of the Related Art

Figure 1A:
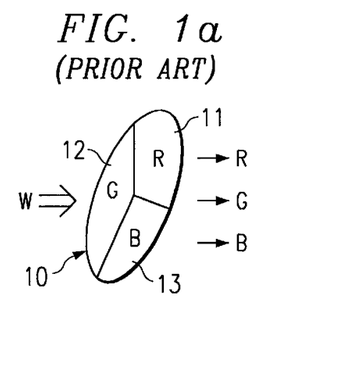
FIG. 1a is a diagram showing a prior art color filter wheel arrangement for a one-chip DMD, Red-Green-Blue, display system.
Figure 1B:
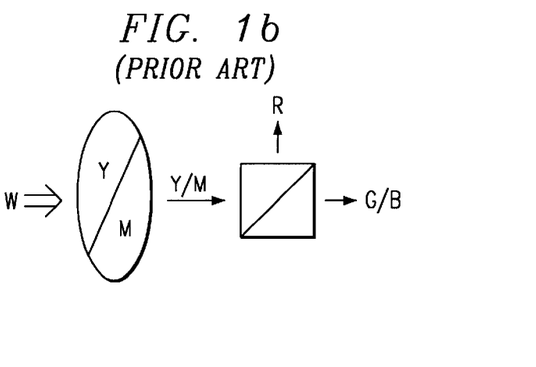
FIG. 1b is a diagram illustrating a prior art color filtering arrangement in a two-chip DMD, Red and Yellow/Magenta display system.

Sequential color display systems, like single-chip micromirror systems, temporally filter the illumination source into primary colors. These typically has been implemented using a spinning wheel that has dichroic filter segments along the outer diameter of the wheel 10, as illustrated in FIG. 1a. For single-panel architectures, the primary color filter set of red 11, green 12, and blue 13 (R-G-B) light is used in every video display frame. Optionally, as shown in FIG. 1b, two-panel optical architectures may use a color splitting prism or dichroic mirror 18 to provide red light (R) to a first modulator panel, and a color filter wheel 15 with yellow 16 (Y) and magenta 17 (M) filters to alternately provide blue (B) and green (G) light to a second modulator panel.

Figure 2A:
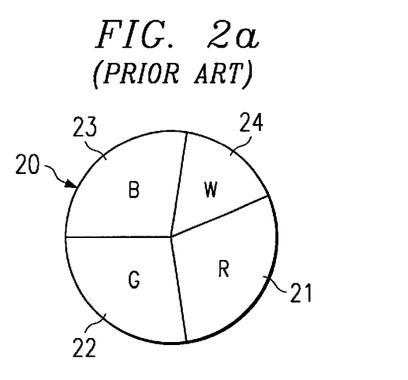
FIG. 2a is a diagram showing a prior art color filter wheel arrangement for a one-chip DMD, Red-Green-Blue-White, display system.

Sequential display systems sometimes add a white (clear) segment to the color wheel 20, as shown in FIG. 2a and disclosed in U.S. Pat. No. 5,233,385, to improve the sequential color efficiency by applying a gain function to the luminance portion of the signal and displaying some portion of the luminance signal during the white segment time, in order to provide a brighter picture on the display. In operation, the white energy (luminance) in each pixel is gained-up by a certain factor and if the R-G-B signal levels saturate, then energy is subtracted from the R-G-B channels and shifted to the white segment. In order to maximize brightness, the outputs of the R-G-B channels are also maximized for a full-white signal. As shown, the color wheel 20 consists of red (R) 21, green (G) 22, blue (B) 23, and clear or white (W) 24 segments.

Figure 2B:
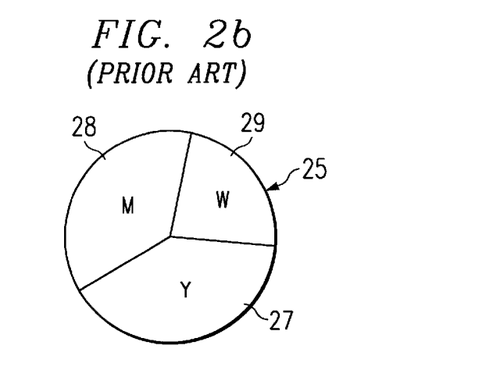
FIG. 2b is a diagram showing a prior art color filter wheel arrangement for a 2-chip DMD, Red and Green-Blue-White, display system.

FIG. 2b shows a color filter wheel 25 with a white segment used in a two-DMD color projector system. In this case, the color filter wheel 25 consists of yellow (Y) 27, magenta (M) 28, and white (W) 29 segments.

Sequential color systems exhibit an undesirable characteristic when eye motion occurs in localized area of black and white pixels in a given image. For relatively slow moving objects, leading edges appear to have a color hew to them, which corresponds to the first color in the color sequence while trailing edges appear to a have color hew of the last color in the color sequence. In scenes that induce rapid eye motion, a color rainbow effect is created that has the appearance of color ghost images in these black and white areas of the picture. In the past, this undesirable color separation has been addressed by means of faster sequencing of the colors; either by faster rotation of the color wheel or by splitting the color wheel filters into multiple sets of R-G-B segments. However, both of these approaches introduce negative factors, such as: (1) audible noise and less mechanical stability when operating the color wheel at higher speeds, (2) decreased efficiency (loss of brightness) due to additional color wheel spokes when adding additions filter segments, and (3) higher cost and (4) increased temporal artifacts (pulse width modulation noise).

There is a recognized need for a method which addresses the color separation problem discussed above in a more elegant way without introducing the new negative factors discussed immediately here above. The invention disclosed herein addresses this need in both a method and an apparatus.

SUMMARY OF THE INVENTION

This invention discloses the method and apparatus for reducing the color separation in a sequential color display system. The disclosed approach adds a white (clear) segment to the color filtering system and applying an algorithm, which separates the luminance channel as much as possible into this white segment. As a result, in the case of a black-and-white image where color separation is most visible, color segments will have a minimal amount of energy in them, thereby reducing the color separation effect.

The algorithm uses a constant ($\alpha$), defined as the ratio of the white segment time to the smallest color segment time, to control the process of transferring as much of the energy as possible from the colored segments into the white segment.

The disclosed method extends the process to dynamically adjust the color segment ($R_{gain}$, $G_{gain}$, and $B_{gain}$) values on a pixel-by-pixel basis, such that colored areas of the image are maximized for brightness and black-and-white areas are maximized for minimum color separation. This allows a trade-off to be made between maximum brightness for the color areas and minimum color separation for the black-and-white areas of the image.

DESCRIPTION OF THE VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

This invention presents a method to reduce the color separation in a sequential color display system. In addition, an approach that allows for a trade-off between color separation and picture brightness, on a pixel-by-pixel basis, is disclosed.

In a first embodiment of the invention, the system that is employed to implement this approach, uses an R-G-B-W color filtering technique; segmented color wheel or other dichroic filter arrangement. An algorithm separates the luminance channel as much as possible into the white channel. Therefore, under the worst-case conditions, for black-and-white image areas in the picture, the colored segments have minimal energy levels. The algorithm for reducing the color separation is described below.

Input Signal Definitions

R,G,B

The red, green, and blue outputs from a preceding degamma circuit.

Alpha (α)

A constant. Set by the proportion or ratio of white segment time to the smallest R-G-B segment time.

CCFR, CCFG, CCFB

Color Correction Factors. Correct for the difference between the white level generated by the white segment and the white level generated by the combination of red, green, and blue filters. Assuming the white-point of the white segment is closely matched to the white-point of the R-G-B (combination) segments, the value normally will be 1.0. If these white points are significantly different, the offset values subtracted from the R-G-B channels must be adjusted to match the difference in the two white-points.

The algorithm is described in psuedo-code below: Algorithm Psuedo-code

Function R-G-B-W(x,y)
  For every pixel
  Y=Min(R,G,B);
  YA=Y*α=$W_{out}$;
  $R_{out}$=[R−(CCFR*$W_{out}$)];
  $G_{out}$=[G−(CCFR*$W_{out}$)];
  $B_{out}$=[B−(CCFR*$W_{out}$)];

In operation, this algorithm determines α as the ratio of the white filter segment time to the smallest color segment time and attenuates the luminance signal (Y) by this factor. This attenuated luminance level (YA), which is also the $W_{out}$ signal, is then color corrected and subtracted from the respective R, G, and B signals to produce the $R_{out}$, $G_{out}$, and $B_{out}$ signals on a pixel-by-pixel basis. This color correction is necessary if the R-G-B white level is significantly different from the white segment level. Ideally, these two white levels will be close, in which case the color correction factor (CCF) will be 1.0. The effect of this process is to separate and move as much as possible of the luminance, in white image areas, into the white segment to minimize the energy level in the R-G-B color segments and thereby reduce the amount of color separation artifact.

An example of the algorithm is given below:
Assume a color wheel with the following color segments:

| Color Segment | Degrees |
| --- | --- |
| Red | 120 |
| Green | 90 |
| Blue | 90 |
| White | 60 |

Then, by definition, α=60/90=2/3, and YA=Y*α=2/3Y=$W_{out}$.

For simplicity in this example, assume that the color correction factors (CCFR, CCFG, and CCFB) are 1.0. During a full-white portion of an 8-bit image, the white input is
  R=G=B=255
  Y=min (R-G-B)=255, and $$W_{Out} = YA = Y*\alpha = 2/3\ Y;$$
$$W_{Out} = 2/3*255 = 170. \text{ Finally,}$$
$$R_{Out} = [R-(CCFR*W_{Out})] = R - W_{Out},$$
$$= [255-(1*170)] = 85,$$
$$G_{Out} = [G-(CCFR*W_{Out})] = G - W_{Out},$$
$$= [255-(1*170)] = 85, \text{ and}$$
$$B_{Out} = [B-(CCFR*W_{Out})] = R - W_{Out},$$
$$= [255-(1*170)] = 85.$$

So, in this example, most of the energy from the full-white portion of the image will be applied in the white-segment and the intensities relative to the color separation will be attenuated by 2/3.

Figure 3:
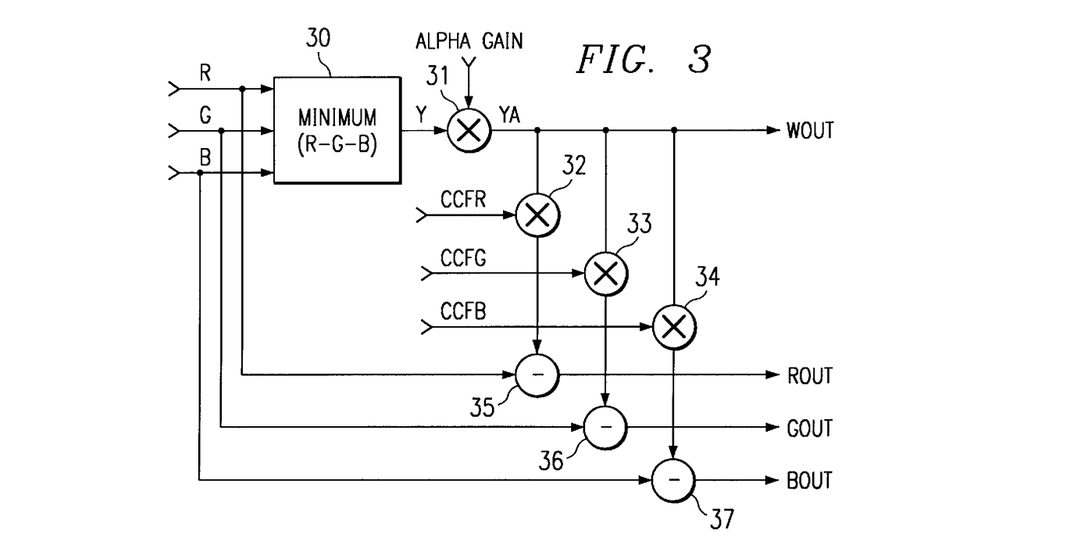
FIG. 3 is a block diagram for the apparatus used to implement the reduced color R-G-B separation algorithm of this invention.

FIG. 3 is a block diagram for the apparatus used to implement the reduced color separation algorithm of this embodiment. The system is comprised of a Minimum (R-G-B) block 30, an alpha gain multiplier (attenuator) 31, color correction factor multipliers CCFR 32, CCFG 33, CCFB 34, and $R_{out}$ subtractor 35, $G_{out}$ subtractor 36, and $B_{out}$ subtractor 37. In operation, the Minimum (R-G-B) block 30 determines the minimum R, G, B signal value and applies it to the alpha gain multiplier 31, where the minimum signal is multiplied by α to provide the $W_{out}$ (white output) signal. Next, on a pixel-by-pixel basis, the $W_{out}$ signal is multiplied by the color correction factors (CCFR, CCFG, and CCFB) in the respective color correction multipliers 32–34 and then these signals are subtracted from the respective R-G-B input signals in the R-G-B subtractors 35–37 to produce the $R_{out}$, $G_{out}$, and $B_{out}$ signals.

Figure 4:
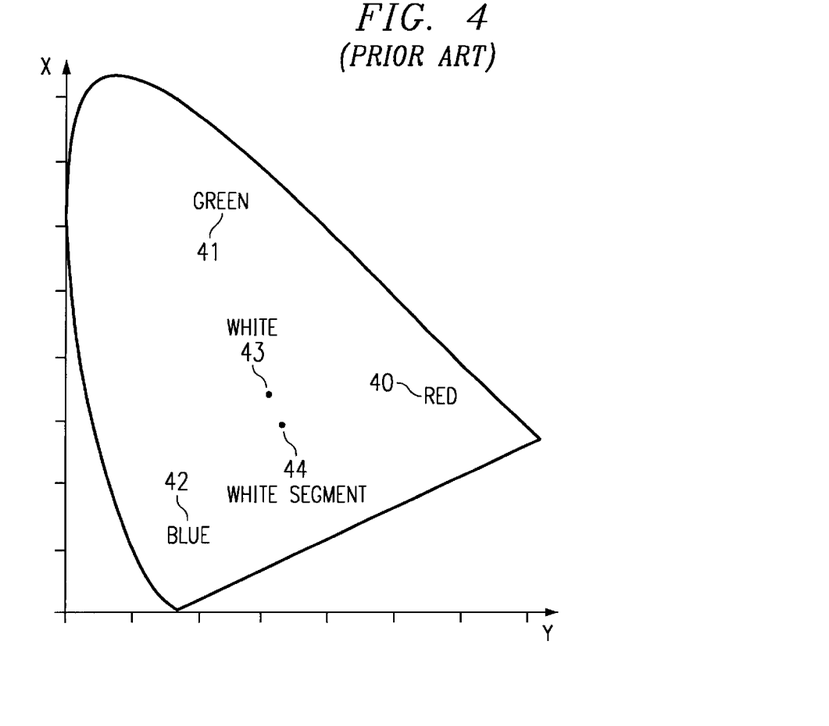
FIG. 4 is a standard CIE chromaticity diagram that plots the R-G-B primary values within the triangle formed by these primary colors. This illustrates the condition where the R-G-B (combination) white and the white color wheel segment levels are different, raising the need for color correction factors to be applied to the R-G-B signals.

FIG. 4 is a standard CIE (x,y) chromaticity diagram showing the video standard R-G-B primaries. The colors that can be represented in R-G-B values lie within the triangle formed by these three primaries (R-G-B). These values for the international high definition television (HDTV) standard are in Table 1 below:

TABLE 1

|   | Red | Green | Blue | White |
|---|---|---|---|---|
| x | 0.640 | 0.300 | 0.150 | 0.3127 |
| y | 0.330 | 0.600 | 0.060 | 0.3290 |
| z | 0.030 | 0.100 | 0.790 | 0.3582 |
| λ-nm | 600 | 550 | 470 | — |

The diagram is a two-dimensional plot showing the x and y locations of the three primary colors; red 40, green 41, and blue 42. Combining the saturated R-G-B colors results in white 43, located in the middle of the triangle. Also shown on the chart is the case where the illumination through the white segment 44 of the color wheel is slightly different (slightly bluish) from the R-G-B (combination) white 43. This would be a case where color correction factors, discussed above, would likely be used.

The algorithm of this invention can be extended to also dynamically adjust the $R_{gain}$, $B_{gain}$ and $G_{gain}$ values on a pixel-by-pixel basis, such that the color areas of the image are maximized for brightness and the black-and-white areas are maximized for color separation (at the expense of some brightness). As before, the algorithm, which is controlled by a constant (α), basically separates the luminance channel as much as possible for white areas in the image into the white channel. Therefore, under the worst-case conditions, for black-and-white image areas, the color segments have minimal energy levels in order to minimize the color separation. However, now colored areas of the image are gained-up to maximize the brightness. This combined algorithm is dynamic on a pixel-by-pixel basis and is described in psuedo-code below.

Input Signal Definitions
R,G,B

The red, green, and blue outputs from a preceeding degamma circuit.

Alpha (α)

A constant. May be set by the proportion or ratio of white segment time to the smallest R-G-B segment time.

Mask

The number of bits displayed in the white segment. $R_{gain}$, $G_{gain}$, $B_{gain}$ Luminance boost factor. The values should be set to 1.0 in order to minimize color separation and should be maximized (1/α) to maximize brightness.

CCFR, CCFG, CCFB

Color Correction Factors. Corrects for the difference between the white segment level and the white level generated by the combination of R-G-B light. Assuming the white-point of the white segment is closely matched to the white-point of the R-G-B (combination) segments, the value will normally be 1.0. If these white points are significantly different, the offset values subtracted from the R-G-B channels must be adjusted to match the difference in the two white-points.

The algorithm is described in psuedo-code below:

Algorithm Psuedo-Code

Function RGBW(x,y)

For every pixel

Y=Min(R,G,B);

YA=Y*α=$W_{out}$;

$W_{out}$=YA 'AND" Mask/*bit-wise AND function*/

$R_{out}$=[R−(CCFR*$W_{out}$)*$R_{gain}$];

$G_{out}$=[G−(CCFR*$W_{out}$)*$G_{gain}$];

$B_{out}$=[B−(CCFR*$W_{out}$)*$B_{gain}$].

In operation, this version of the algorithm also determines α as the ratio of the white filter segment time to the smallest segment time and multiplies the luminance signal (Y) by this factor, giving the result YA. This signal (YA) is then gated by means of an 'AND' gate with a mask signal, corresponding to the number of bits displayed in the white segment, to produce the output ($W_{out}$) signal. The output signal ($W_{out}$) is then applied to three multipliers, one for each primary color (R-G-B), where the signal is multiplied by a color correction factor to properly correct for any difference between the combined R-G-B white level and the white segment level. Ideally, these two white levels will be close in value, in which case the color correction factor (CCF) will be 1.0. These color corrected signals are then subtracted from the respective R, G, and B signals and then multiplied by the appropriate $R_{gain}$, $G_{gain}$, and $B_{gain}$ to produce the $R_{out}$, $G_{out}$, and $B_{out}$ signals. The effect of this process is to separate as much as possible of the luminance, in white image areas, into the white segment to minimize the energy level in the R-G-B color segments and thereby reduce the amount of color separation artifact and/or to apply gain to the luminance levels of non-white image areas.

An example of this dynamic algorithm is given below:

Assume a color wheel with the following color segments:

| Color Segment | Degrees |
|---|---|
| Red | 120 |
| Green | 90 |
| Blue | 90 |
| White | 60 |

Then, by definition, α=60/90=2/3, and

YA=Y*α=2/3 Y=$W_{out}$,

Set Mask=175, and

For simplicity of this example, assume that white balance, color correction factors CCFR=CCFG=CCFB=1.0.

Then for a full-white portion of an 8-bit image, the white input is

R=G=B=255,

Y=min (R-G-B)=255,

YA=(255*2/3)=170, $$W_{out} = YA \,\&FA = (170 \text{ 'AND' } 75) = 170, \text{ and}$$

$$R_{out} = [(R - (CCFR * W_{out})) * R_{gain}]$$
$$= [R - (1 * W_{out})] * R_{gain},$$
$$= [(255 - (1 * 170) * R_{gain}]$$
$$= 85 * R_{gain},$$

-continued $$G_{out} = [(G - (CCFR * W_{out})) * G_{gain}]$$
$$= [G - (1 * W_{out})] * Ggain,$$
$$= [(255 - (1 * 170) * G_{gain}]$$
$$= 85 * G_{gain}, \text{ and}$$

$$B_{out} = [(B - (CCFR * W_{out})) * B_{gain}]$$
$$= [B - (1 * W_{out}) * B_{gain}],$$
$$= [(255 - (1 * 170) * B_{gain}]$$
$$= 85 * B_{gain}.$$

So, in this example, most of the energy is applied to the white segment during white portions of the image, while gain is applied, on a pixel-to-pixel basis, to the $R_{out}$, $G_{out}$, and $B_{out}$ signals during non-white portion of the image. As in the previous example, this ⅔-color separation reduction trade-off comes at the expense of some loss in image brightness.

Figure 5:
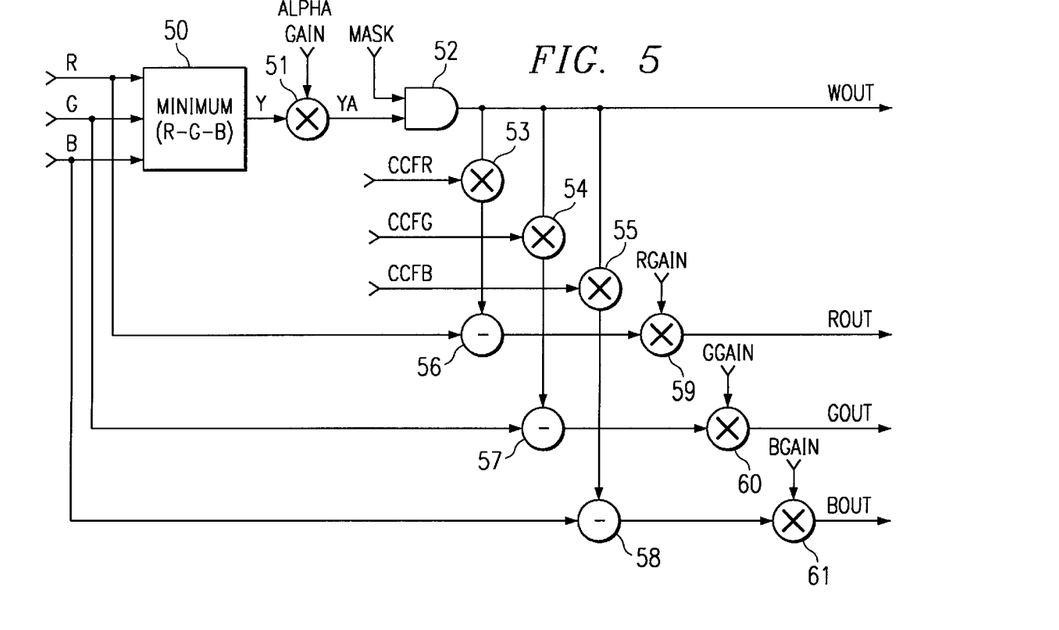
FIG. 5 is a block diagram for the single-SLM R-G-B system of this invention, which allows for a trade-off between reduced color separation in the black-and-white areas of the image and increased overall brightness of the image.

In the first embodiment of the invention, which is employed to implement the approach where a trade-off is made between the amount of color separation reduction and image brightness, a single-SLM and an R-G-B-W color-filtering technique is used; segmented color wheel or other dichroic filter arrangement. FIG. 5 shows the block diagram for this dynamically controlled circuit, which is an extension of the color separation circuit of FIG. 3, discussed above. In this case, the circuit is comprised of a Minimum (R-G-B) block 50, an alpha gain multiplier 51, a mask gate 52, color correction factor multipliers CCFR 53, CCFG 54, CCFB 55, $R_{out}$ subtractor 56, $G_{out}$ subtractor 57, and $B_{out}$ subtractor 58, and gain multipliers $R_{gain}$ 59, $G_{gain}$ 60, and $B_{gain}$ 61. In operation, the Minimum (R-G-B) block 50 determines the minimum R, G, B signal and applies it to the alpha gain multiplier 51, where it is multiplied by α to provide the YA signal. The YA signal is then gated by an 'AND' gate 52 to provide the $W_{out}$ (white output) signal. Next, on a pixel-by-pixel basis, the $W_{out}$ signal is multiplied by the color correction factors (CCFR, CCFG, and CCFB) by the respective color correction multipliers 53–55 and these signals are subtracted from the respective R-G-B input signals in the R-G-B subtractors 56–58. The outputs from the respective subtractors are then gained by means of amplifiers (multipliers) 59–61 to provide the $R_{out}$, $G_{out}$, and $B_{out}$ signals.

Figure 6:
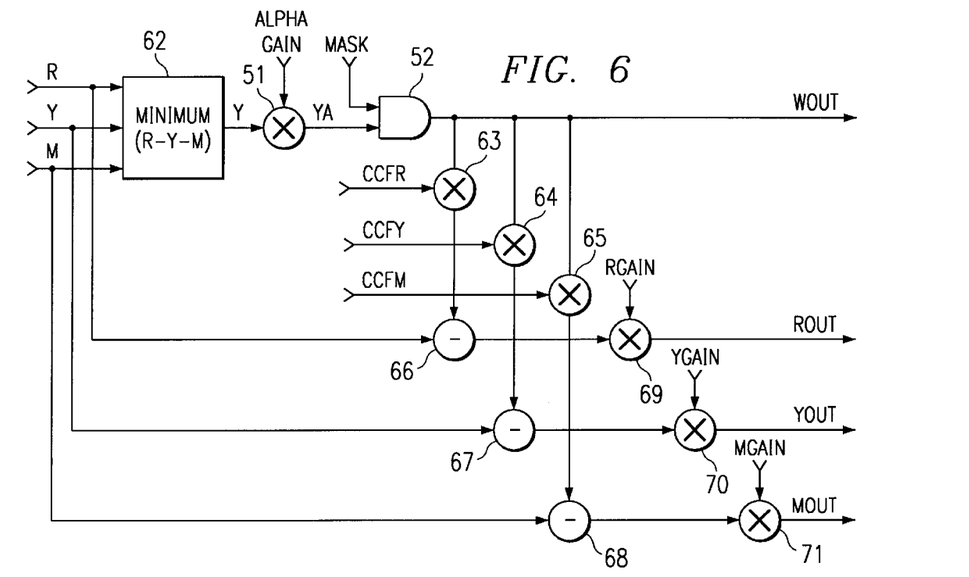
FIG. 6 is a block diagram for the two-SLM R-Y-M system of this invention, which allows for a trade-off between reduced color separation in the black-and-white areas of the image and increased overall brightness of the image.

A second embodiment of the invention uses two-SLMs and an R and Y-M-W color filtering technique; one DMD dedicated to red illumination and the second DMD illuminated from a yellow-magenta-white (Y-M-w) segmented color wheel. FIG. 6 shows the block diagram for this dynamically controlled circuit. In this case, the circuit is comprised of a Minimum (R-Y-M) block 60, an alpha gain multiplier 61, a mask gate 62, color correction factor multipliers CCFR 63, CCFY 64, CCFM 65, $R_{out}$ subtractor 66, $Y_{out}$ subtractor 67, and $M_{out}$ subtractor 68, and gain multipliers $R_{gain}$ 69, $Y_{gain}$ 70, and $M_{gain}$ M1. In operation, the Minimum (R-Y-M) block 60 determines the minimum R, Y, M signal and applies it to the alpha gain multiplier 61, where it is multiplied by α to provide the YA signal. The YA signal is the gated by an 'AND' gate 62 to provide the $W_{out}$ (white output) signal. Next, on a pixel-by-pixel basis, the $W_{out}$ signal is multiplied by the color correction factors (CCFR, CCFY, and CCFM) by the respective color correction multipliers 63–65 and then these signals are subtracted from the respective R-Y-M input signals in the R-Y-M subtractors 66–68. The outputs from the respective subtractors are then gained by means multipliers 69–71 to provide the $R_{out}$, $Y_{out}$, and $M_{out}$ signals.

Figure 7A:
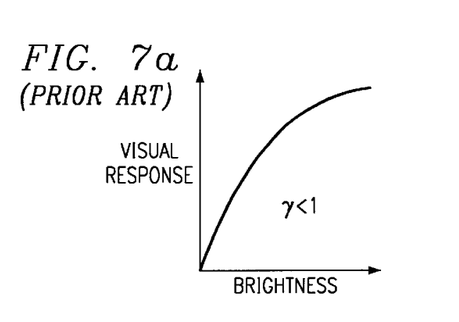
FIGS. 7a and 7b are standard gamma correction plots of visual response vs. brightness representing a γ<1 and γ>1, respectively, in a video processing chain.
Figure 7B:
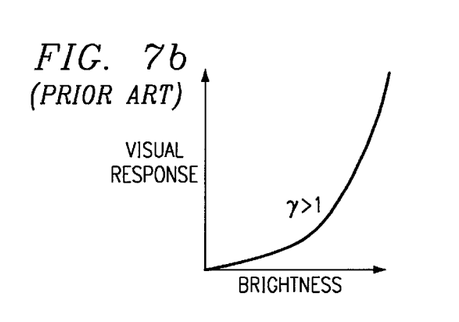

Gamma (γ) is a numerical factor used in most television and film reproductions that compensates for the non-linear response of cathode-ray-tube (CRT) displays. FIGS. 7a and 7b show plots of visual response vs. brightness for γ<1 and γ>1, respectively. The gamma factor represents the slope of the linear portions of these curves. The curve in FIG. 7a (γ<1) is bowed downward with the greatest slope for low values (start of curve). Similarly, the curve in FIG. 7b (γ>1) is bowed upward, making the start of the curve relatively flat at low values with the greatest slope at the upper portion of the curve. Gamma values >1 tend to expand the white portion of the image, making the picture look contrasty. For example, commercial motion pictures, shown in a darkened theater, tend to have this high-contrast appearance. On the other hand, gamma values <1 tend to compress the white portions of the image to make the image look softer. DMD and other digital projectors tend to have a gamma of 1, which makes it desirable to remove any gamma correction or non-linearity from the video source signal.

Figure 8A:
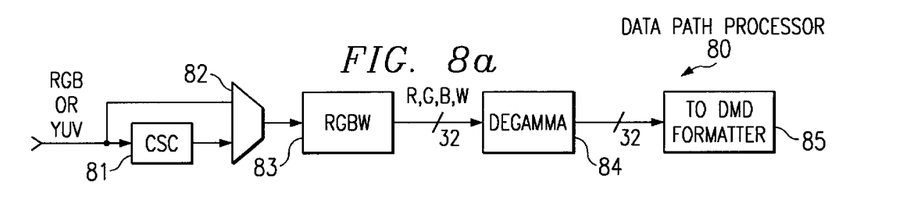
FIG. 8a is a block diagram for the display processing chain of this invention with an R-G-B-W function inserted before the degamma function.
Figure 8B:
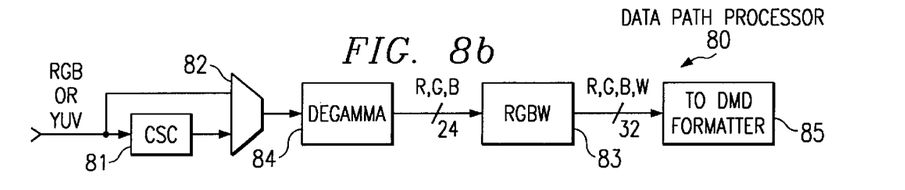
FIG. 8b is a block diagram for the display processing chain of this invention with an R-G-B-W function inserted after the degamma function.

Since modern displays, such as the DMD display, tend to have a linear response and do not exaggerate any of the light values, it is desirable to remove this gamma function from the video source before displaying it. This is accomplished by applying a degamma function to the video signal. FIGS. 8a and 8b show where the R-G-B-W filter of this invention is placed in the display processing chain 80 relative to the degamma function 84. FIG. 8a shows the preferred placement of the R-G-B-W filter 83, which is located in the chain in front of the degamma function 84. The display processing chain consists of a color space conversion function 81, a multiplexer 82, the R-G-B-W filter function 83 (could be R, Y-M-W) of this invention, a degamma function 84, and the DMD formatter circuitry 85. The reason it is preferred to put the R-G-B-W filter before the degamma function is that if gain is applied to the signal, the low level signal noise will be less apparent since the low level signals are compressed. However, it is perfectly acceptable to place the R-G-B-W filter after the degamma function, as shown in FIG. 8b. In this case, the display processing chain 80 sequence consists of a color space conversion function 81, a multiplexer 82, a degamma function 84, the R-G-B-W filter function 83 of this invention, and the DMD formatter circuitry 85. Both FIGS. 8a and 8b are applicable for R-G-B color-coded or YUV color difference coded video signals.

Figure 9:
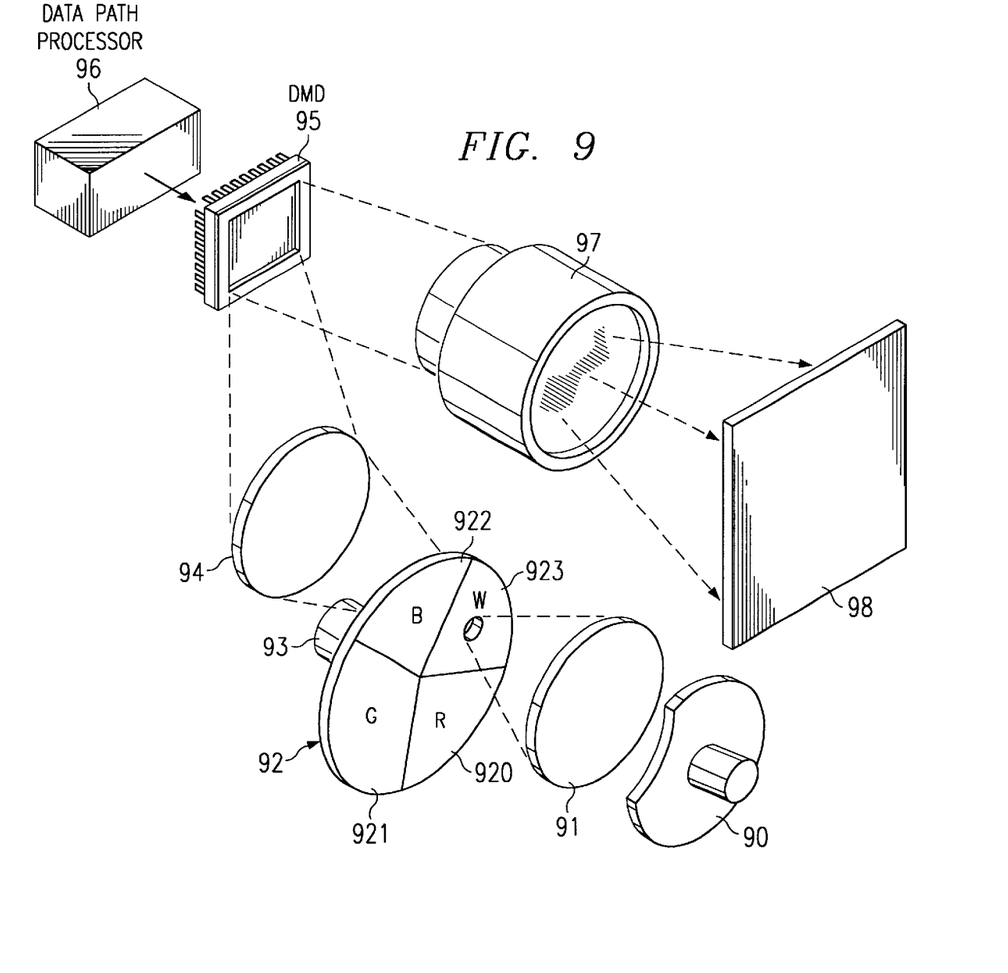
FIG. 9 is a block diagram of a single-SLM, R-G-B-W, sequential color projection display which uses the method of this invention to either reduce the color separation artifact or to improver the over image brightness, or both simultaneously.

FIG. 9 is a block diagram for a single-DMD, sequential color projection display that applies the algorithm of this invention to an R-G-B-W color filtering arrangement. The system operates on a pixel-to-pixel basis to either reduce the color separation artifact or improve the brightness of a displayed image or both. The projection system is comprised of white light source 90, a primary condenser lens 91, an R-G-B-W segmented color wheel 92, a color wheel motor 93, a secondary condenser lens 94, a DMD 95, data path processing circuitry 96, a zoom (or fixed) projection lens 97, and a display screen 98. The R-G-B-W color wheel 92 further consists of color segments R 920, G 921, R 922, and W 923. In operation, white light from the light source 90 is focused down to a small spot by the primary condenser lens 91 at the point where it passes through the color filter wheel 92. The sequential R-G-B-W light is then resized by a secondary condenser lens 94 to fit the surface of the SLM 95. The SLM is controlled by a data path processor 96, as discussed in FIGS. 8a and 8b. Modulated light reflecting from the SLM then passes through a projection lens 97 on to the display screen 98. The display's data path processing electronics 96 implements the algorithm of this invention in conjunction with the single-DMD color filtering technique described above, on a pixel-by-pixel basis, to effectively allow for a trade-off between color separation artifact reduction and overall image brightness.

Figure 10:
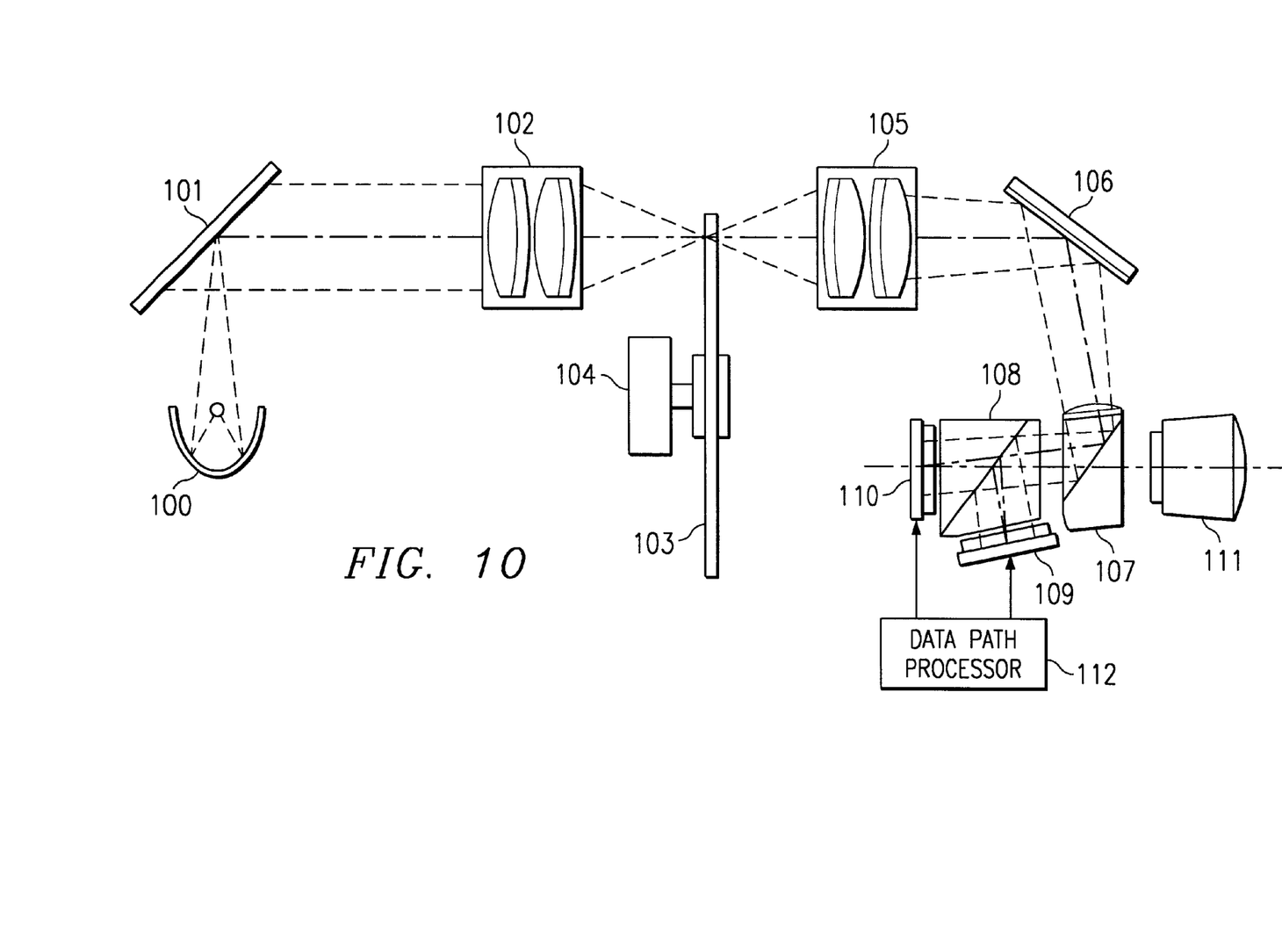
FIG. 10 is a block diagram of a two-SLM, R and Y-M-W, sequential color projection display which uses method of this invention to either reduce the color separation artifact or to improver the over image brightness, or both simultaneously.

FIG. 10 is a block diagram for a two-DMD, sequential color projection display that uses the algorithm of this invention to an R and Y-M-W color filtering arrangement. The system operates on a pixel-to-pixel basis to either reduce the color separation artifact or improve the brightness of a displayed image or both. The projection system is comprised of light source 100, a first turning mirror 101, a primary condenser lens 102, an R-Y-M-W segmented color wheel 103, a color wheel motor 104, a secondary condenser lenses 105, a second turning mirror 106, a total internal reflective (TIR) lens 107, R and Y-M color prisms 108, a red (R) SLM 109, a yellow-magenta (Y-M) SLM 110, a projection lens (fixed or zoom) 111, and a data path processing circuitry 112. In operation, the display's data path processing electronics 112 implements the algorithm of this invention in conjunction with the two-DMD color filtering technique described above, on a pixel-by-pixel basis, to effectively allow for a trade-off between color separation artifact reduction and overall image brightness.

While this invention has been described in the context of a method and preferred embodiments, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

What is claimed is:

1. A method for reducing the color separation artifacts in a sequential color display system, the method comprising the steps of:

sequentially providing primary colored and white light beams to at least one spatial light modulator, each of said primary colored and white light beams having a segment duration;

receiving primary color intensity data values for an image pixel;

determining the minimum of said primary color intensity data values;

setting α equal to the ratio of white segment duration to the smallest duration of said primary colored light beams;

determining the white output signal by multiplying said minimum value by said α value;

transferring a portion of said white light beam to an image pixel, said white portion determined by said minimum value;

transferring a portion of each primary color light beam to said image pixel, said primary portion determined by a corresponding one of said primary color intensity data values minus a quantity of said minimum value multiplied by a correction factor.

2. The method of claim 1, wherein a maximum amount of luminance is separated into said white channel, leaving minimal energy in R-G-B channels.

3. The method of claim 2, wherein said constant, α, determines the amount of luminance that is shifted into said white channel.

4. A single-SLM sequential color projection display system, whereby a white segment is included in a color filter and used to provide a trade-off between reduced color separation in the black-and-white portion of the image and brightness in the color portions of the image, comprising:

a light source emitting white light along a first path;

a primary condenser lens in said first light path bringing said light to a small spot at the surface of an R-G-B-W color filter wheel;

a secondary condenser lens receiving light passing through said color filter wheel and resizing said light to fit the surface of a SLM;

a data path processor receiving video data from a video input and controlling said SLM to digitally modulated said light on surface of said SLM according to said video data;

said modulated light from turned-on pixels reflecting off surface of said SLM along a second light path, through a projection lens, and on to a display screen; wherein said data path processor:

determines the minimum R-G-B value, Y, for each pixel;

determines the value of α as the ratio of white segment time to the smallest R-G-B segment time;

determines the white output level by multiplying said Y value by said α value;

color corrects the white output for red light by multiplying said white output level by a red color correction factor;

color corrects the white output for green light by multiplying said white output level by a green color correction factor;

color corrects the white output for blue light by multiplying said white output level by a blue color correction factor;

determines the red output level projected on to said display screen by subtracting said red color corrected white level from the red input level and multiplying the result by a red gain factor;

determines the green output level projected on to said display screen by subtracting said green color corrected white level from the green input level and multiplying the result by a green gain factor;

determines the blue output level projected on to said display screen by subtracting said blue color corrected white level from the blue input level and multiplying the result by a blue gain factor.

5. The projection display system of claim 4, wherein said data path processor further comprises:

a color space converter receiving an R-G-B input signal;

a color signal multiplexer, wherein a first input is coupled to the output of said color space converter and a second input is coupled to said R-G-B input signal;

R-G-B-W color separation circuitry, the input being coupled to the output of said color signal multiplexer;

a degamma circuit for removing non-linearity from said video signal, the input being coupled to the output of said R-G-B-W color separation circuitry; and a SLM formatter, the input being coupled to the output of said degamma circuit and the output being coupled to said SLM.

6. The projection display system of claim 4, wherein said data path processor further comprises:

a color space converter receiving an R-G-B input signal;

a color signal multiplexer, wherein a first input is coupled to the output of said color space converter and a second input is coupled to said R-G-B input signal;

a degamma circuit for removing non-linearity from said video signal, the input being coupled to the output color signal multiplexer;

R-G-B-W color separation circuitry, the input being coupled to the output of said degamma circuit; and a SLM formatter, the input being coupled to the output of said R-G-B-W color separation circuitry and the output being coupled to said SLM.

7. The projection display system of claim 6, wherein a maximum amount of luminance is separated into the white channel and the overall image brightness during the color portion of the image is increased by applying gain to the color signals.

8. A method of producing an image pixel, said method comprising:

receiving an intensity value for each primary color for said pixel;

determining a minimum of said primary color intensity values, said minimum representing a white content of said pixel;

calculating a white intensity data value for said pixel based on a saturation level of said pixel, said white value higher for unsaturated pixels and lower for saturated pixels;

directing primary colored and white light to said pixel, wherein more of said white content for said pixel is produced by a white light beam when said pixel is unsaturated, and more of said white content is produced by primary color beams when said pixel is saturated.

* * * * *